United States Patent [19]
Kazumi

[11] Patent Number: 5,097,283
[45] Date of Patent: Mar. 17, 1992

[54] CAMERA
[75] Inventor: Jiro Kazumi, Yokohama, Japan
[73] Assignee: Canon Kabushiki Kaisha, Tokyo, Japan
[21] Appl. No.: 633,115
[22] Filed: Dec. 24, 1990
[51] Int. Cl.⁵ ............................................. G03B 7/00
[52] U.S. Cl. .................................................. 354/412
[58] Field of Search ................................. 354/21, 412
[56] References Cited
U.S. PATENT DOCUMENTS
4,349,272  9/1982  Holthusen ........................ 354/21 X
4,783,672 11/1988  Wirty et al. .......................... 354/21
4,853,733  8/1989  Watanabe et al. .................. 354/412

Primary Examiner—Michael L. Gellner
Attorney, Agent, or Firm—Fitzpatrick, Cella, Harper & Scinto

[57] ABSTRACT

A camera has detection means for detecting a signal representative of set information from an information supplying apparatus, first control means for performing a particular camera operation on the basis of the result of the detection by the detection means, and second control means for performing a preset initial camera operation when the detection by the detection means has never been effected.

31 Claims, 8 Drawing Sheets

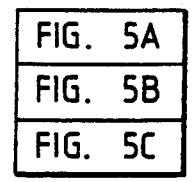
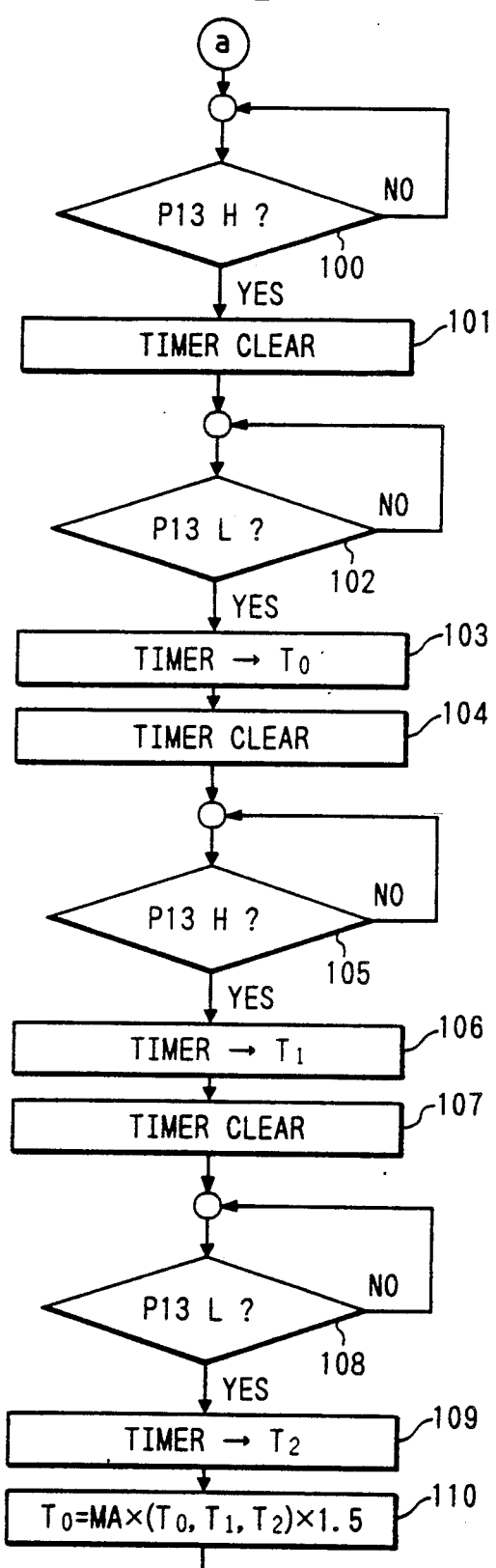
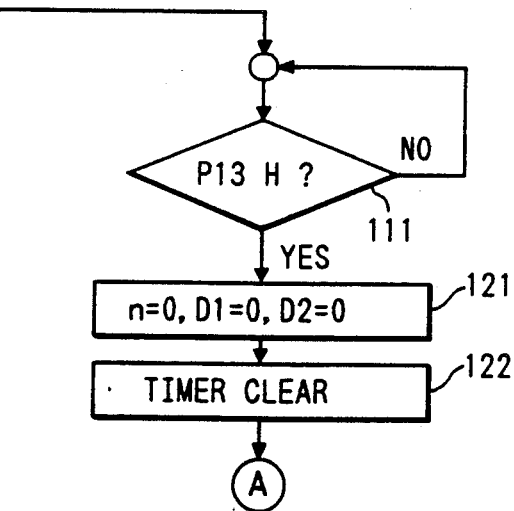

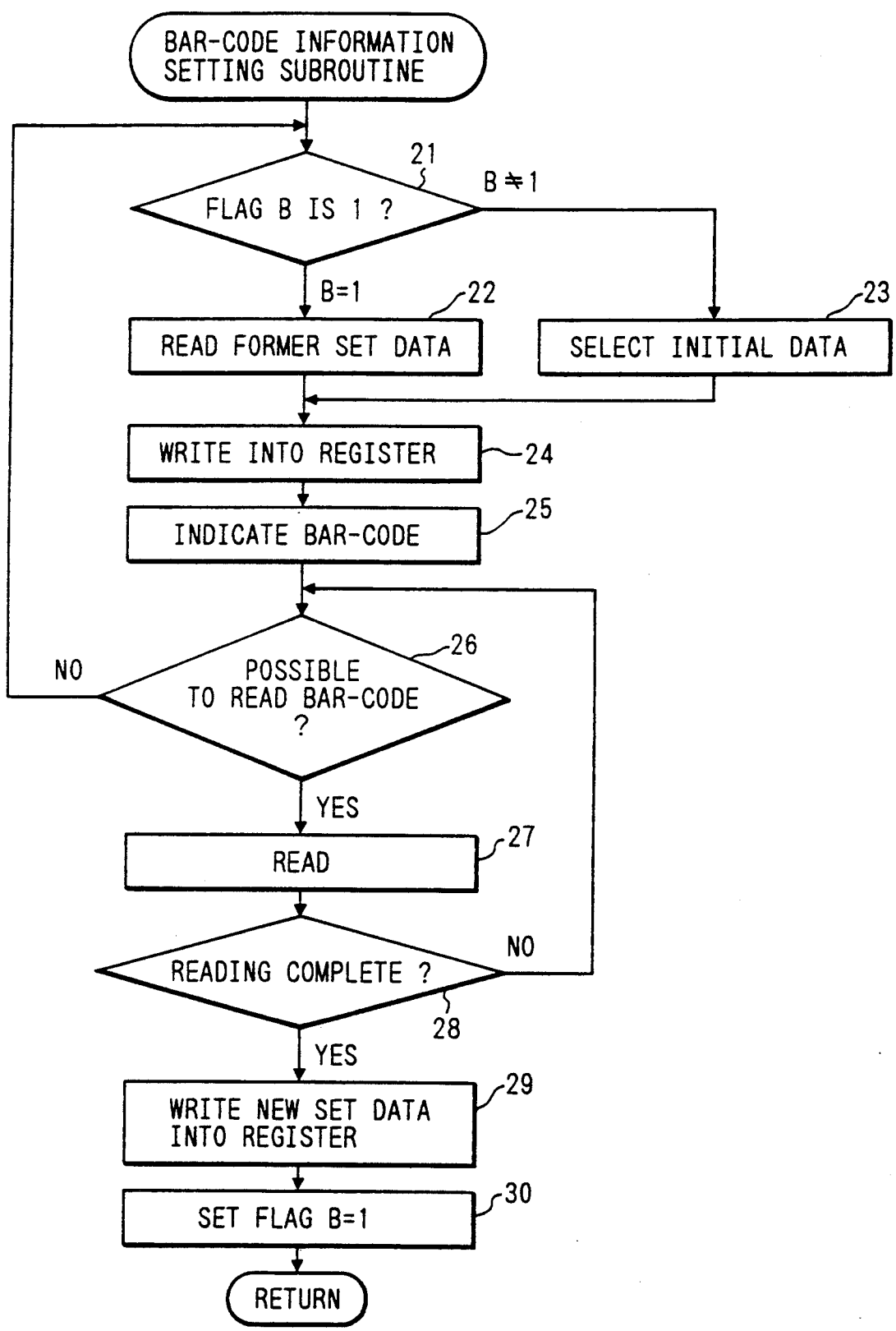

CAMERA

BACKGROUND OF THE INVENTION

1. Field of the Invention

This invention relates to a camera capable of giving and receiving signals between it and an information supply apparatus.

2. Related Background Art

Heretofore, in program AE, the shutter speed and the aperture value have corresponded at one to one to an EV value. However, depending on the purpose of photographing or the object to be photographed, it is sometimes desirable to choose a particular shutter speed (or aperture value). Therefore, there has been proposed a camera having a plurality of program lines and used with the program lines changed over.

However, depending on the purpose of photographing, it has sometimes been difficult to judge which of the program lines should be chosen. For example, when a close-up photograph of flowers is to be taken, if the photograph is directed to the use as a record, it is desirable to stop down the lens as much as possible and make the depth of field deep, and if the photograph is directed to the expression of the beauty of the flowers, it is often desirable to make the depth of field shallow. To judge this, it is necessary to know what effect the aperture gives the photograph. Also, the depth of field varies greatly from lens to lens and therefore, it is necessary to know the effect thereof.

Also, the prior-art camera has a wide variety of program lines and therefore need have indicating means and input means for the change-over of the program lines, and this has led to the problem that the indication and operation become more complicated than in the case of a single program.

SUMMARY OF THE INVENTION

One aspect of this invention is to provide a camera which is designed to perform a preset initial operation when a signal from an information supply apparatus is not detected and which can therefore always perform the photographing operation.

BRIEF DESCRIPTION OF THE DRAWINGS

FIG. 7 is a flow chart.

DETAILED DESCRIPTION OF THE PREFERRED EMBODIMENTS

Figure 1A:
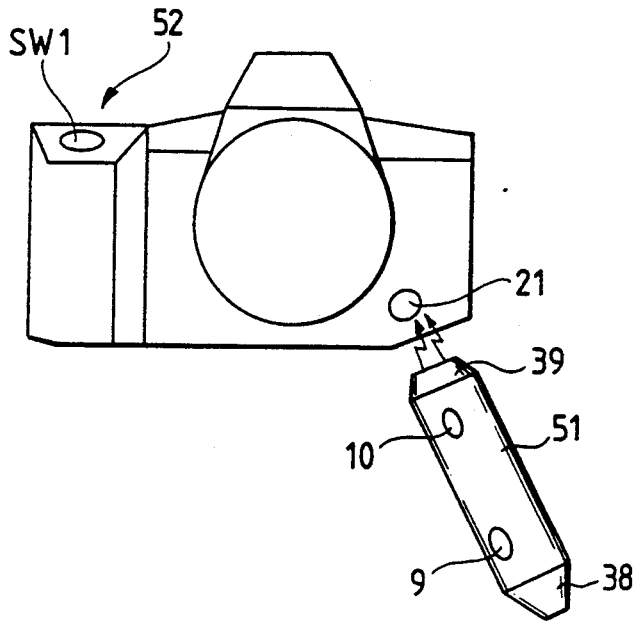
FIGS. 1A and 1B are pictorial views of a camera body and a code reading apparatus according to an embodiment of the present invention.
Figure 1B:
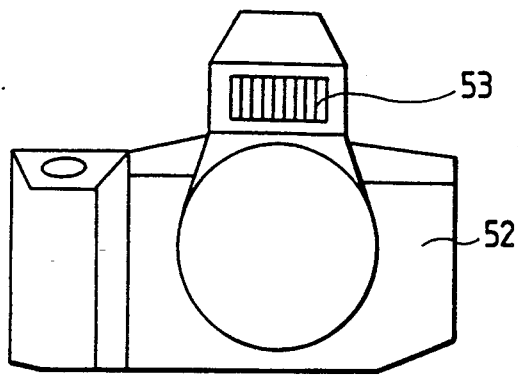

FIGS. 1A and 1B are pictorial views of a camera body 52 and a code reading and supplying apparatus 51 according to an embodiment of the present invention. FIG. 1A shows a state in which bar code information read by the code reading and supplying apparatus 51 is being transmitted as a light signal to the light receiving portion 21 of the camera body 52, and FIG. 1B shows a state in which a flash unit 53 contained in the camera body 52 is automatically popped up. In these figures, the reference character SW1 designates a release button, the reference numerals 9 and 10 denote switches, the reference numeral 38 designates a code reading portion, and the reference numeral 39 denotes a light signal transmitting portion.

Figure 2:
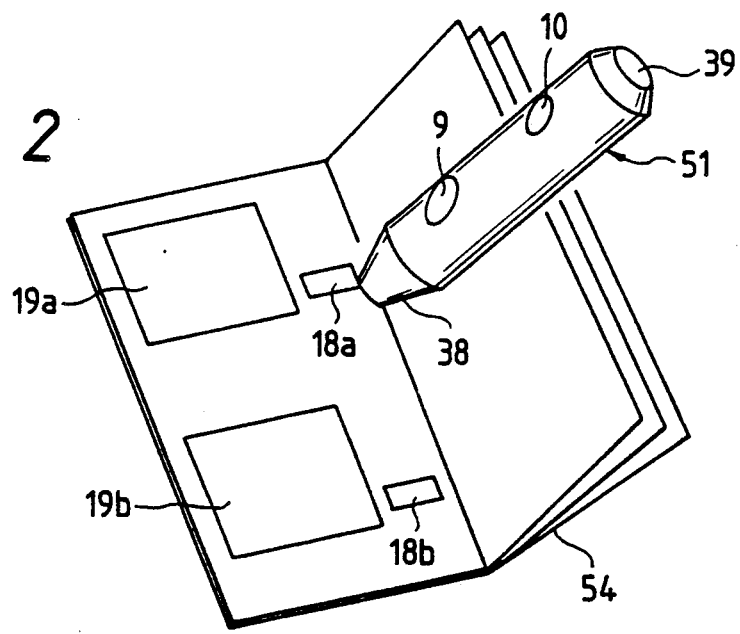
FIG. 2 is an illustration showing a state in which a bar code list used is being read by a code reading apparatus.

FIG. 2 shows a state in which a bar code list 54 used in the present embodiment is being read by the code reading apparatus 51 shown in FIG. 1A. On the bar code list 54, there are printed photographs 19a and 19b which are examples and bar code portions 18a and 18b corresponding to the photographs 19a and 19b, respectively. In FIG. 2, there is shown a state in which the reading operation is being performed with the bar code portion 18a traced by the code reading portion 38 of the code reading and supplying apparatus 51.

Figure 3:
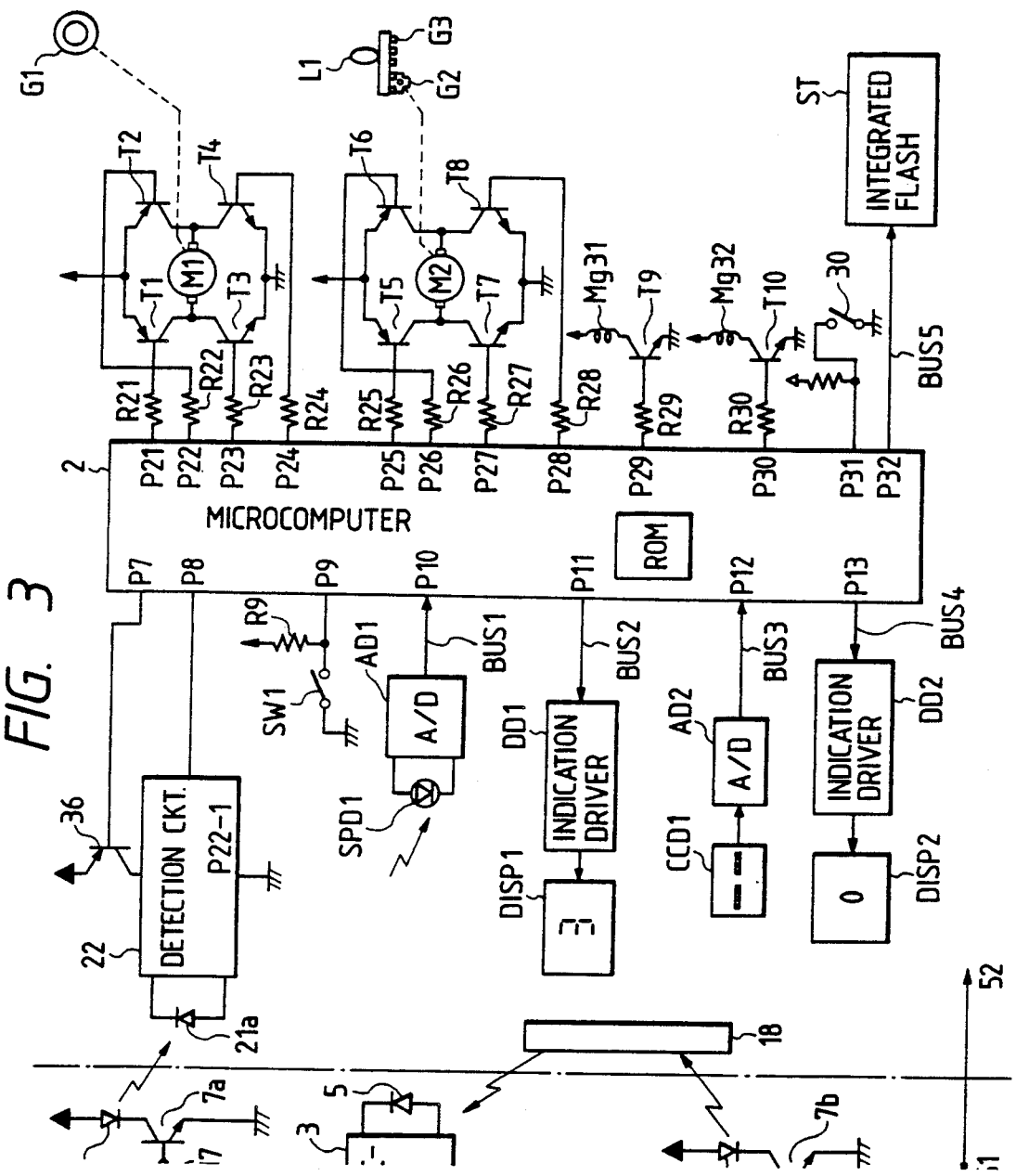
FIG. 3 is a diagram showing the circuit construction of the embodiment.

Referring to FIG. 3 which is a diagram showing the circuit construction according to the present embodiment, the reference numeral 51 designates the code reading and supplying apparatus and the reference numeral 52 denotes the camera body.

On the code reading and supplying apparatus 51 side, the reference numeral 1 designates a 1-chip microcomputer (hereinafter referred to as the microcomputer 1) which effects code reading and supply control. The microcomputer 1 is comprised of a CPU, a ROM, a RAM, an IO, a serial communication interface (hereinafter referred to as the SCI) and a timer. In the IO of the microcomputer 1, an input port P3 is connected to the output of a detection circuit 3 for effecting code detection which will be described later. Other input ports P1 and P2 are connected to switches 9 and 10, respectively, and these input ports are pulled up to a power source by resistors 13 and 14. The output port P4 of the IO of the microcomputer 1 is connected to one input of an OR circuit 17. The output port P5 of the SCI of the microcomputer 1 is connected to one input of a NOR circuit 11, and the other input of the NOR circuit 11 is connected to an oscillation circuit 12 of 38 KHz, the output of which provides the other input of the OR circuit 17, and the output of the OR circuit 17 is connected to the base of a transistor 7a which will be described later. Thus, the output from the output port P5 of the SCI is output as a signal modulated at 38 KHz. An output port P6 controls the operation of a transistor 7b.

The reference numeral 5 designates a silicon photodiode (hereinafter referred to as the SPD) adapted to detect the reflected light from a code portion (hereinafter referred to as the bar code portion) 18 comprised of optically readable black bars and white spaces illuminated by light emitted from IRED 8b. The reference numeral 3 denotes a detection circuit having therein an amplifying portion for amplifying the signal level. The detection circuit 3 is adapted to detect the output of the SPD 5 and put out a low level if the output of the SPD 5 is the space portion of the bar code portion 18, and put out a high level if the output of the SPD 5 is the bar portion. The collector sides of the transistors 7a and 7b are connected to IREDs 8a and 8b, respectively. The reference numeral 15 designates a power supply battery for supplying electric power to the MCU1, the detection circuit 3, the IRED 4 and the IREDs 8a and 8b. The reference numeral 16 denotes a sound producing member for displaying that code reading has been properly effected.

On the camera 52 side, the reference numeral 2 designates a microcomputer which effects the control of the camera. The microcomputer 2, like the microcomputer 1, is comprised of a CPU, a ROM, a RAM, an IO and an SCI. The reference character 21a denotes an SPD constructed in the light receiving portion 21 (see FIG. 1A) so as to receive infrared light emitted from the IRED 8a. The SPD 21a is connected to a detection circuit 22, which is adapted to output a low level signal from an output port 22-1 only when there is a signal modulated at 38 KHz. The power source of the detection circuit 22 is switched by a transistor 36, the base of which is connected to the output port P7 of the microcomputer 2. The output port 22-1 is connected to the input port P8 of the SCI of the microcomputer 2.

P9 in the microcomputer 2 denotes an input port to which a low level signal is input by the release button SW1 of the camera shown in FIG. 1 being depressed, SPD1 designates a silicon photodiode for effecting the light metering operation, AD1 denotes an AD converter for converting the signal of the silicon photodiode SPD1 which is an analog value into a digital value and transmitting it to the microcomputer 2, BUS1 designates a bus line for the transmission thereof, and P10 denotes an input port for inputting the AD-converted value.

DD1 designates an indication driving circuit for driving a display device DISP1, P11 denotes an output port for sending a signal to the indication driving circuit DD1, and BUS2 designates a bus line for the transmission thereof. CCD1 denotes a line sensor for distance measurement, AD2 designates an AD converter for converting the signal of the line sensor CCD1 which is an analog value into a digital value and transmitting it to the microcomputer 2, BUS3 denotes a bus line for the transmission thereof, and P12 designates an input port for inputting the AD-converted value. DISP2 denotes a display device for displaying the state of focusing displayed within the viewfinder of the camera, DD2 designates an indication driving circuit for driving the display device DISP2, P13 denotes an output port for sending a signal to the indication driving circuit DD2, and BUS4 designates a bus line for the transmission thereof.

M1 denotes a motor for feeding film. The collector of a PNP transistor T1 and the collector of an NPN transistor T3 are connected to one end of the motor M1, and the collector of a PNP transistor T2 and the collector of an NPN transistor T4 are connected to the other end of the motor M1. The emitters of the PNP transistors T1 and T2 are connected to the + (plus) side of the source voltage, and the emitters of the NPN transistors T3 and T4 are connected to the − (minus) side of the source voltage. The bases of the PNP transistors T1 and T2 are connected to the output ports P21 and P22, respectively, of the microcomputer 2 through base resistors R21 and R22, respectively, and the bases of the NPN transistors T3 and T4 are connected to the output ports P23 and P24, respectively, of the microcomputer 2 through base resistors R23 and R24, respectively. As will be seen from such construction, when the transistors T1 and T4 are in their conductive state, an electric current flows from left to right in the motor M1 as viewed in FIG. 3 and the motor M1 rotates clockwise to effect the winding-up of the film and shutter charge, and when the transistors T2 and T3 are in their conductive state, an electric current flows from right to left in the motor M1 as viewed in FIG. 3 and the motor M1 rotates counter-clockwise to effect the rewinding of the film. The motor M1 operates in operative association with a spool G1 for this.

M2 designates a motor for moving a focusing optical system L1 back and forth. The collector of a PNP transistor T5 and the collector of an NPN transistor T7 are connected to one end of the motor M2, and the collector of a PNP transistor T6 and the collector of an NPN transistor T8 are connected to the other end of the motor M2. The emitters of the PNP transistors T5 and T6 are connected to the + (plus) side of the source voltage, and the emitters of the NPN transistors T7 and T8 are connected to the − (minus) side of the source voltage. The bases of the PNP transistors T5 and T6 are connected to the output ports P25 and P26, respectively, of the microcomputer 1 through base resistors R25 and R26, respectively, and the bases of the NPN transistors T7 and T8 are connected to the output ports P27 and P28, respectively, of the microcomputer 2 through base resistors R27 and R28, respectively. When the transistors T5 and T8 are in their conductive state, an electric current flows from left to right in the motor M2 and the motor M2 rotates clockwise to axially outwardly move the focusing optical system L1 through a pinion gear G2 and a rack G3. When the transistors T6 and T7 are in their conductive state, an electric current flows from right to left in the motor M2 and the motor M2 rotates counter-clockwise to axially inwardly move the focusing optical system L1 through the pinion gear G2 and the rack G3.

An NPN transistor T9 is a switching transistor having its emitter grounded and its collector connected to the + (plus) side of the source voltage through a magnet coil Mg31. The base of the transistor T9 is connected to the output port P29 of the microcomputer 2 through a resistor R29. When the transistor T9 is rendered conductive, the magnet coil Mg31 is electrically energized and the forward curtain of a shutter, not shown, is moved. Likewise, an NPN transistor T10 is a switching transistor having its emitter grounded and its collector connected to the + (plus) side of the source voltage through a magnet coil Mg32. The base of the transistor T10 is connected to the output port P30 of the microcomputer 2 through a resistor R30. When the transistor T10 is rendered conductive, the magnet coil Mg32 is electrically energized and the rearward curtain of the shutter, not shown, is moved.

ST designates an integrated flash unit movably supported in the contained state of FIG. 1A and the popped-up state of FIG. 1B at the vertex position of a pentaprism. BUS5 denotes a bus line for the integrated flash unit ST.

The reference numeral 30 designates a switch adapted to be closed when bar code information is received from the code reading and supplying apparatus 51. The switch 30 is designed to be closed, for example, by a light signal transmitting portion 39 being urged against the light receiving portion 21 of the camera 52.

The format of the bar code portion 18 will now be described.

The bar code of the bar code portion 18 is comprised of thin lines (hereinafter called narrow bars), thick lines (hereinafter called wide bars), narrow intervals between the bars (hereinafter called narrow spaces) and wide intervals between the bars (hereinafter called wide spaces), and "0" is made to correspond to the narrow bars and the narrow spaces, and "1" is made to correspond to the wide bars and the wide spaces. The ratio between the widths of the narrow spaces and the narrow bars is 1 : 1, and the ratio between the widths of the narrow bars and the wide bars is 1 : 3. The bar code portion 18 (18a, 18b) is shown in FIG. 4.

As shown in FIG. 4, the bar code always begins with a combination (called the start bar) of two narrow bars and a narrow space, and ends with a narrow space (called the end bar) sandwiched between a wide bar and a narrow bar. Data are written between the start bar and the end bar, and these data are written with five bars and five spaces corresponding thereto as a unit, and it is to be understood that the respective data express one-figure numbers.

Figure 4A:
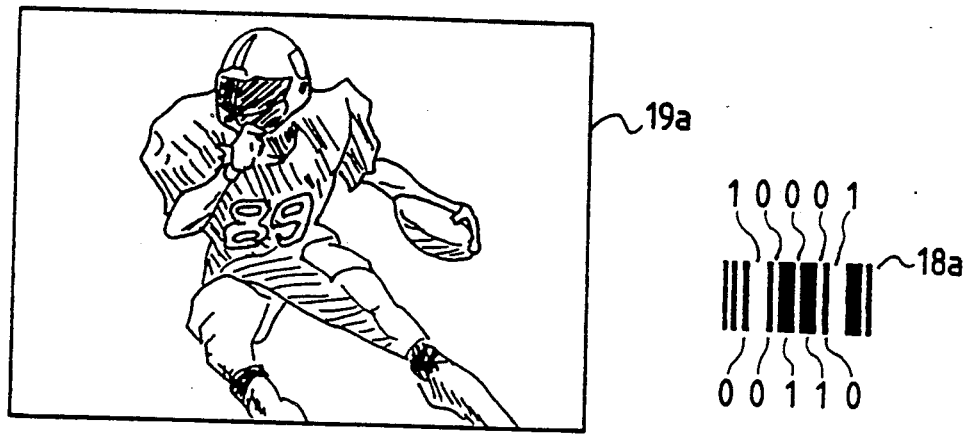
FIGS. 4A and 4B are enlarged views of the bar code list.
Figure 4B:
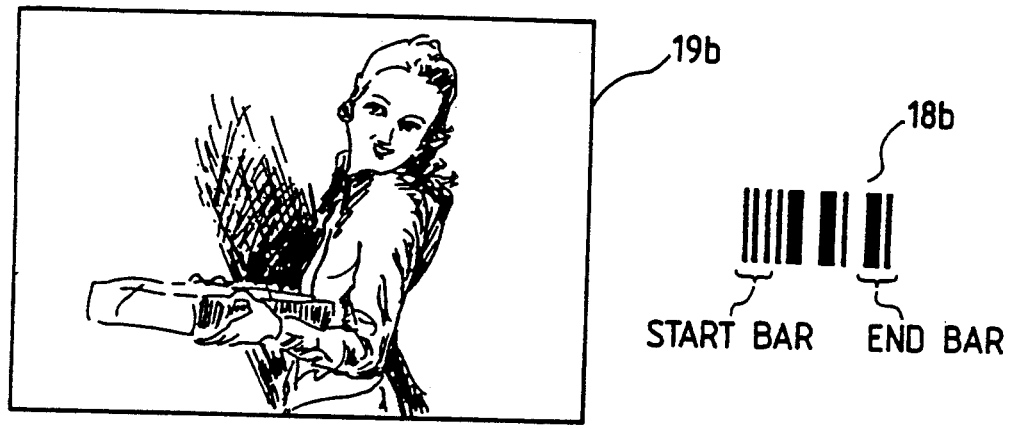

For example, in the bar code portion 18a shown in FIG. 4, in subsequence to the start bar, "00110" is indicated by the bars with the narrow bars as "0" and the wide bars as "1", and likewise in the space, "10001" is indicated. Accordingly, it will be seen that the bar code portion 18a of FIG. 4A is a (decimal) bar code showing e.g. "03" and in the same manner, the bar code portion 18b of FIG. 4B is a bar code showing e.g. "04".

Figure 5B:
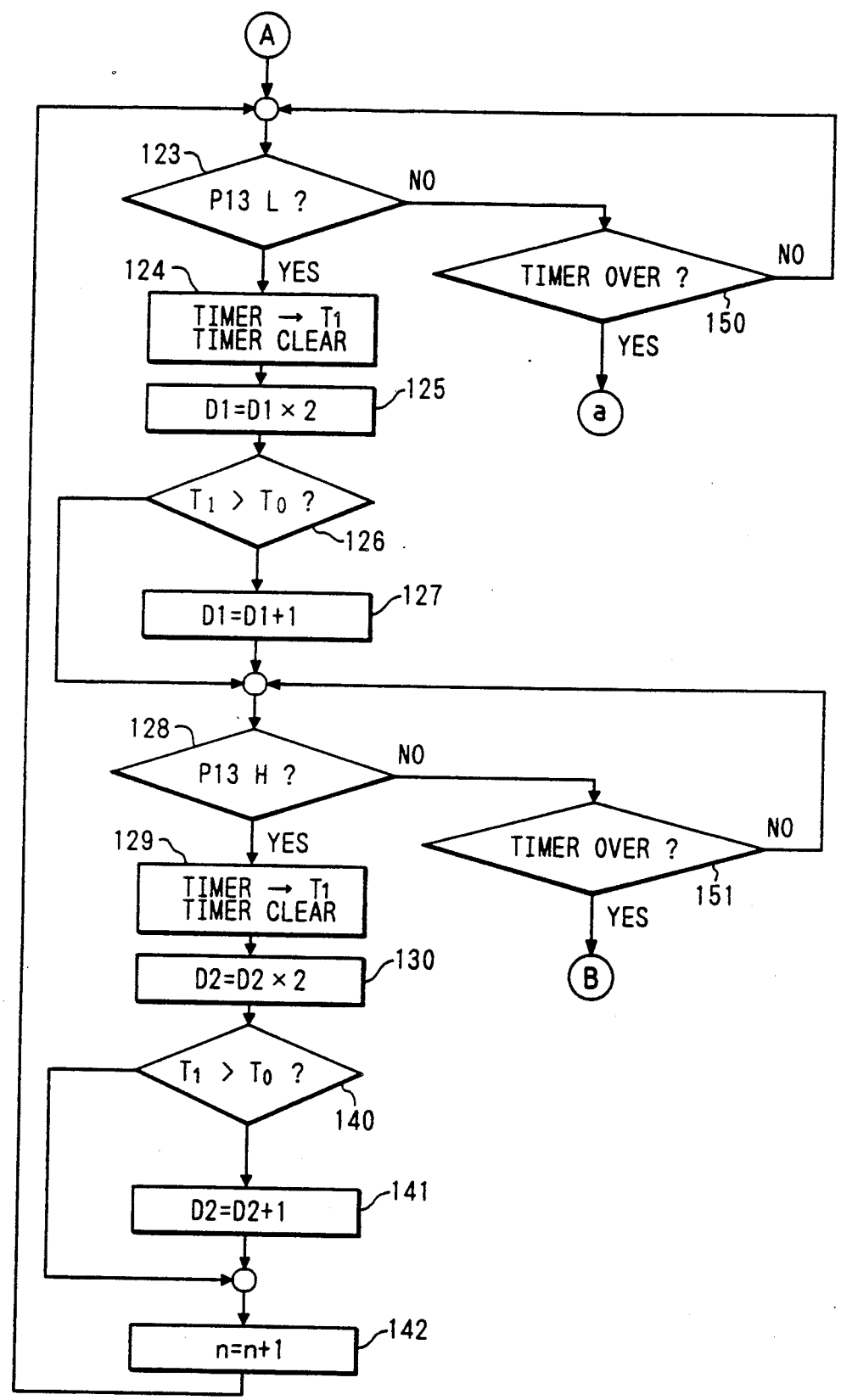
FIG. 5, consisting of FIGS. 5A, 5B and 5C, is a flow chart.
Figure 5C:
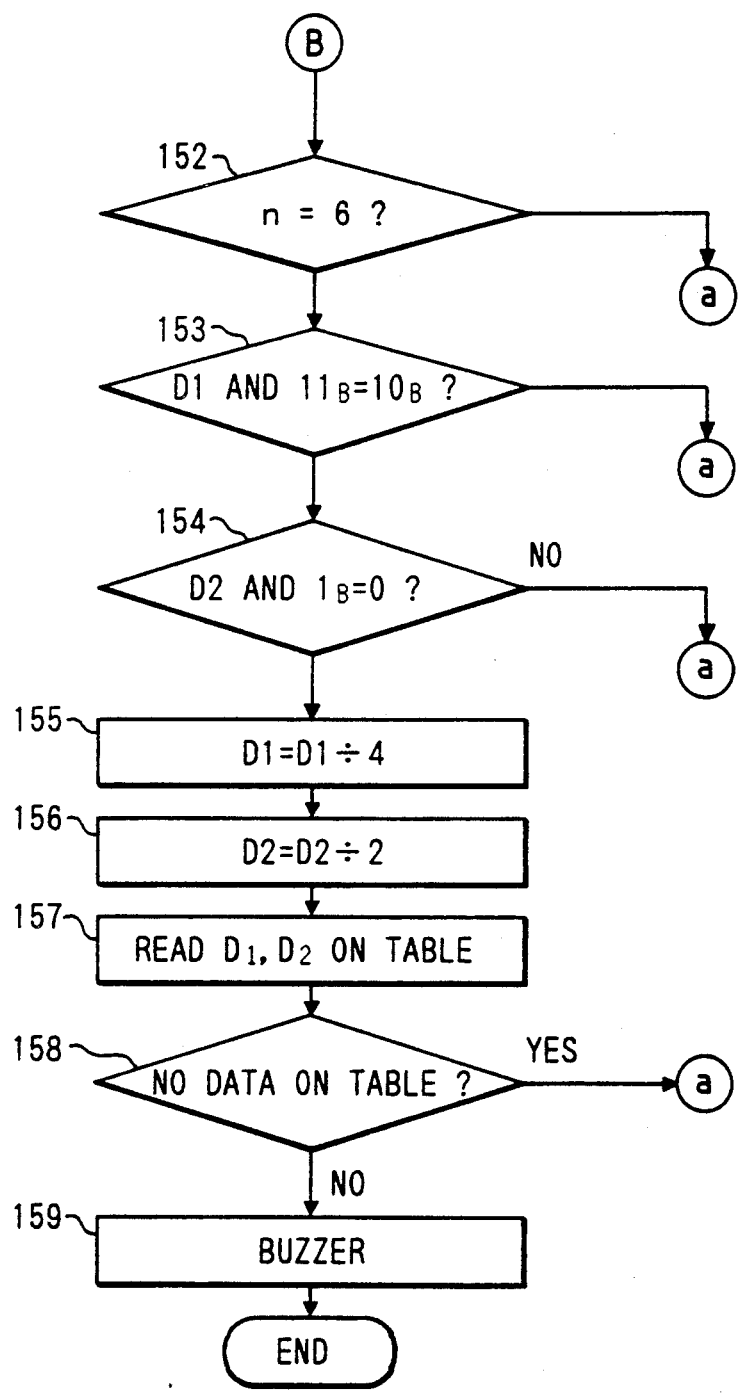

The bar code reading operation will now be described with reference to the flow chart of FIG. 5.

As previously described, when the output of the detection circuit 3, i.e., the input to the input port P3 of the microcomputer 1, is at a high level, the bar code portion 18 is in the state of bar, and when the output of the detection circuit 3 is at a low level, the bar code portion 18 is in the state of space.

Six registers T0, T1, T2, n, D1 and D2 are prepared in the RAM in the microcomputer 1.

First, at a step 100, it is waited for the first bar to be found out, and at steps 101-103, the time of the first narrow bar is measured, and at steps 104 to 106, the time of the narrow space is measured, and at steps 107 to 109, the time of the next narrow bar is measured, and 1.5 times the maximum value thereof is used as a time T0 to be used to judge whether the bar is narrow or wide.

When the measurement of the time T0 by the start bar is terminated, at a step 121, a register for data is cleared and the reading of data is started.

At steps 123 and 124, the time of the bar is read and if it is greater than the time T0, it is judged to be "1", and the data is doubled and "1" is added thereto. In the other cases, doubling alone is effected. At steps 128 and 129, the time of the space is read and if likewise, it is greater than the time T0, it is judged to be "1" and a similar operation is performed.

Each time one set of bar and space is read, the register n is incremented and the reading of the bar and the space is repeated.

At steps 150 and 151, the overflow of a timer is detected. If there is the overflow, it is judged that the reading of the bar code has been terminated. If at the step 150, there is the overflow, it is judged to be an error and again, (a), i.e., the operation from the step 100, is performed. If at the step 151, there is the overflow, whether the termination is normal is checked by the number of bars first at a step 152, and then at steps 153 and 154, the end bar is checked, and if the result is NG (the termination is not normal), it is judged to be an error and again, the operation from (a) is performed. If the termination is judged to be normal, the display to that effect is done by the sound producing member 16.

Description will now be made of the reading of the bar code portion 18a corresponding to the photograph 19a. To effect the reading of the bar code, the bar code portion 18a is traced by the reading portion 38 while the switch 9 is depressed. When the switch 9 is depressed, the microcomputer 1 renders the output port P6 into a high level and therefore, the transistor 7b is rendered conductive and the IRED 8b is turned on.

At the same time, the microcomputer 1 effects the reading of the bar code. Here, the bar code portion 18a expresses "03" (decimal) and therefore, the value thereof is read and once stored in the internal RAM. When the switch 9 is opened, the microcomputer 1 renders the output port P6 into a low level.

Description will now be made of a case where the data retained in said internal RAM is transmitted to the camera body 52.

The light signal transmitting portion 39 is urged against the light receiving portion 21 of the camera body 52.

When the switch 30 is closed and the input port P31 assumes a low level, the microcomputer 2 outputs a low level to the output port P7 and renders the transistor 36 conductive. By the transistor 36 being thus rendered conductive, electric power is supplied to the detection circuit 22, which thus becomes able to receive a signal.

When the switch 10 of the code reading and supplying apparatus 51 side is then depressed, the microcomputer 1 outputs from the SCI (the output port P5) binary data "00000011" resulting from "03" being converted into BCD code.

This output is modulated at 38 KHz by the NOR circuit 11, renders the transistor 7a conductive and turns on the IRED 8a. The data (infrared light) emitted from the IRED 8a is detected by the SPD 21a disposed in the camera 52, is demodulated by the detection circuit 22 and is input to the SCI of the microcomputer 2. Thus, the microcomputer 2 has received data "00000011", i.e., hexadecimal data "03".

The microcomputer 2 stores this data "03" in a portion of the RAM therein.

The operation of the microcomputer 2 of the camera side will now be described with reference to the flow chart of FIGS. 6 and 7.

Step 1

Whether the camera body 52 has been operated into a mode in which the inputting of bar code information is possible, i.e., the bar-code mode, is examined. Various specific examples of the changeover operation to the bar-code mode would occur to mind, but the changeover by a rotary switch, for example, is desirable, because the photographer can always visually observed the change-over state of mode.

At the step 1, advance is made to a step 2 only when the camera is in the bar-code mode.

Step 2

The bar code information setting sub-routine shown in FIG. 7 is executed.

Step 21

The content of a flag B representing whether bar code information has been previously input is examined. If the flag B is not "1" (B≠1), it means that the setting of exposure control by the bar code information has never been effected. If the flag B is "1" (B=1), it means that the setting of exposure control by the bar code information has been effected at least once.

If the flag B is "1", advance is made to a step 22, and if the flag B is not "1", advance is made to a step 23.

Step 22

Set data including the exposure control data by the former bar code information is read out from EEPROM.

Step 23

Set data including the initial exposure control data is read out from EEPROM.

The initial set data is the normal program shown in a step 11 which will be described later.

Step 24

The set data is written into the register of the microcomputer 2.

Step 25

Display expressing the set data which can now be executed is effected on the display device DISP1 (see FIG. 3). This display is carried out, for example, by the use of "numerals", "alphabet", etc.

Step 26

Whether the reading of the bar code information by the light receiving portion 21 is possible is judged. That is, the code reading and supplying apparatus 51 is urged against the light receiving portion 21 to examine whether the switch 30 is ON. If the switch 30 is ON, advance is made to a step 27, and if the switch 30 is OFF, it is waited for the switch 30 to be ON. At this step 26, the state of the switch 30 is examined to judge not only whether advance can be made to the next step 27, but also judge the following conditions.

First, when the release operation is going on, even if the switch 30 is ON, advance cannot be made to the step 27. This means that actually for the purpose of photographing, in a single-lens reflex camera, the reading of new bar code information is not effected in order to prevent malfunctioning during the release operation in which there occur the movement of the main mirror and sub-mirror to their retracted positions for photographing, the operation of the diaphragm, the operation of the shutter, the return of the main mirror and sub-mirror to their initial positions, etc.

Secondly, during the feeding (winding-up and rewinding) of the film, advance cannot be made to the step 27 even if the switch 30 is ON. This means that during the operation of the motor M1, i.e., during the winding-up and rewinding of the film, the meaningless reading of new bar code information is not effected.

Besides these, when the mode is being changed over and when the mode has been changed over from the bar-code mode to other mode, reading is not effected.

Step 27

The detection circuit 22 is rendered operative and the reading of the bar code information by the SPD 21a is effected.

Step 28

Whether the light signal input from the SPD 21a coincides with preset definitions (the presence of the start bar and the end bar, the length of message, etc.) is judged, and if the former coincides with the latter, advance is made to a step 29, and if the former does not coincide with the latter, return is made to the step 26.

The operation up to these steps 26–28 is made effective for a predetermined time for the purpose of lengthening the life of the integrated battery.

Step 29

Set data corresponding to newly read bar code information is written into the register. Consequently, the set data so far written (the former set data or the initial set data) is erased.

Step 30

If the flag B representing whether the bar code information has been previously input is not "1", the flag B is changed to "1" at this step.

Figure 6:
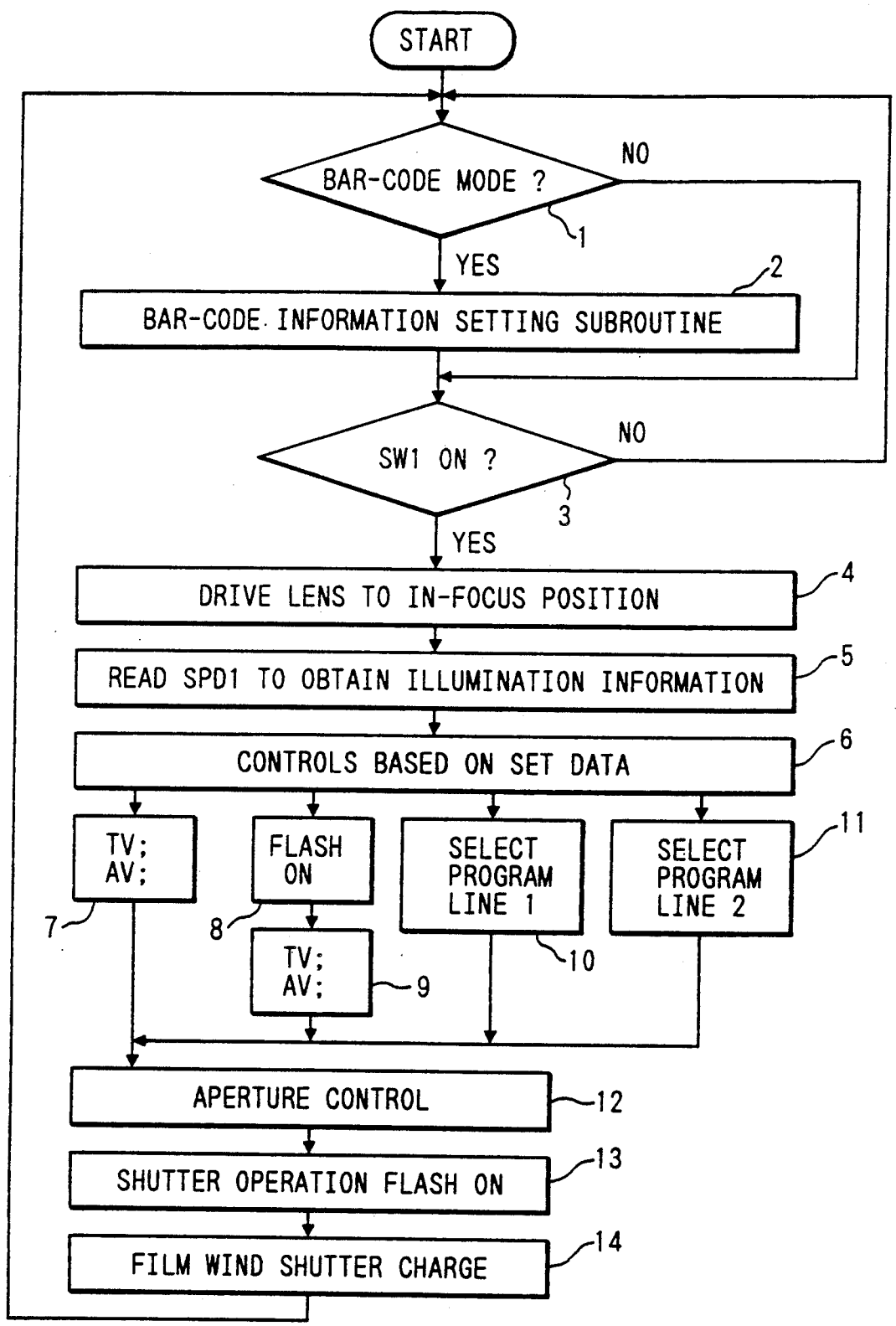
FIG. 6 is a flow chart.

Return is then made to the main flow, and advance is made to the step 3 of FIG. 6. When the release button SW1 is depressed at the step 3 and advance is made to the release operation even if the reading operation by the step 27 is not performed, return is made to the main flow.

Step 3

Whether the release button SW1 is depressed is discriminated through the input port P9, and if the release button is depressed, advance is made to a step 4, and if not so, return is made to the step 1.

Step 4

Signal outputting is effected from the output ports P25, P26, P27 and P28, and the focusing optical system L1 is moved back and forth and moved to the in-focus position.

Then, data for effecting the in-focus display is output from the output port P13 to the indication driving circuit DD2 through the bus line BUS4.

Step 5

The illumination information output from the silicon photodiode SPD1 is read from the input port P10 through the bus line BUS1 and light metering calculation is effected.

Step 6

The actual operation program is executed on the basis of the set data written into the register at the step 29 or the set data written into the register at the step 24.

Steps 7–11

Steps 7–11 show four kinds of exposure controls which can be executed (selected) by the bar code information.

Step 7 shows the first exposure control flow in which the shutter time and the aperture value are set irrespective of the photometric value.

Steps 8 and 9 show the second exposure control flow for nighttime photographing. At the step 8, the integrated flash unit 53 (ST) is automatically popped up and the charging of the main capacitor for flashing is effected by the output of the output port P32, and at the step 9, the shutter time is made equal to the flash tuning time and also, the exposure control by a preset aperture value (from the photograph 19 shown in FIG. 4, the aperture value is determined with the distance of the main object as a preset distance) is provided.

Step 10 shows the third exposure control flow suitable for the sports photographing shown in FIG. 4A. The shutter time is set to a high speed (e.g. 1/500 sec.), the aperture is found from the illumination information by calculation, and as regards the auto-focusing, the servo mode is provided in which the auto-focusing operation is continued even after the in-focus, and as regards the film winding-up, each port is controlled so that continuous photographing may be provided.

Step 11 shows the fourth exposure control flow suitable for the normal photographing shown in FIG. 4B, and the aperture value and the shutter time are found from the illumination information by calculation, and as regards the auto-focusing, the one-shot mode is provided in which the auto-focusing operation after the first focusing is inhibited, and as regards the film winding-up, each port is controlled so that single-shot photographing may be provided.

Step 12

The aperture is stopped down to the aperture value found by any of the steps 7-11.

Step 13

A high signal is first output from the output port P30 so as to provide the shutter time found also by any of the steps 7-11, whereby the NPN transistor T9 is rendered conductive to electrically energize the magnet Mg31 and effect the movement of the forward shutter curtain, and after a predetermined shutter time, a high signal is output from the output port P30 to render the NPN transistor T10 conductive and thereby electrically energize the magnet Mg32 and effect the movement of the rearward shutter curtain.

When the steps 8 and 9 have been selected, the integrated flash unit 53 (ST) is caused to emit light upon completion of the movement of the forward shutter curtain.

Step 14

The transistors T1 and T4 are rendered conductive by the output ports P21, P22, P23 and P24 to thereby rotate the motor M1 and effect the winding-up of the film and shutter charge.

The embodiment described above can execute a particular camera operation by the signal from the information reading and supplying apparatus and therefore, photographing which makes the best use of various special techniques becomes easy to accomplish. Also, even when there is no detection of the signal from the information reading and supplying apparatus, photographing is made possible by the preset initial operation, and this leads to the obtainment of the effects that a countermeasure can be taken for malfunctioning and that any shutter chance will not be missed.

What is claimed is:

1. A camera comprising:
   (a) detection means for detecting a signal representative of set information from an information supplying apparatus;
   (b) first control means for performing a particular camera operation on the basis of the result of the detection by said detection means; and
   (c) second control means for performing a preset initial camera operation when the detection by said detection means has never been effected.

2. A camera according to claim 1, wherein said set information is output in the form of a light signal from said information supplying apparatus.

3. A camera according to claim 2, wherein said detection means includes a circuit for receiving said light signal.

4. A camera according to claim 1, wherein said particular camera operation includes an exposure control operation.

5. A camera according to claim 1, wherein said initial camera operation includes an exposure control operation.

6. A camera according to claim 4, wherein said initial camera operation includes an exposure control operation.

7. A camera according to claim 1, wherein the state in which the detection by said detection means has never been effected is judged by memory information.

8. A camera according to claim 1, wherein said particular camera operation is selected from among a plurality of exposure control operations on the basis of said set information.

9. A camera according to claim 1, further comprising a switch for causing the detecting operation by said detection means to be executed.

10. A camera according to claim 9, wherein said switch is operated by the contact between said information supplying apparatus and a camera body.

11. A camera system comprising:
    (A) an information reading and supplying apparatus including:
    (A-1) first detection means for detecting a code representative of set information; and
    (A-2) output means for converting said set information read by said first detection means into a signal for supply and outputting it;
    (B) a camera body including:
    (B-1) second detection means for detecting said signal for supply output from said output means;
    (B-2) first control means for performing a particular camera operation on the basis of the result of the detection by said second detection means; and
    (B-3) second control means for performing a preset initial camera operation when the detection by said second detection means has never been effected.

12. A camera system according to claim 11, wherein said code is a bar code, and said first detection means reads the information of said bar code by the utilization of light.

13. A camera system according to claim 12, wherein said first detection means has light projecting means and light receiving means for reading said bar code, and light produced by said light projecting means is applied to said bar code and the reflected light therefrom is discriminated by said light receiving means, whereby said first detection means reads the information of said bar code.

14. A camera system according to claim 11, wherein said output means includes light signal generating means, and outputs said set information by a light signal.

15. A camera system according to claim 14, wherein said second detection means includes a circuit for receiving said light signal.

16. A camera system according to claim 11, wherein said particular camera operation includes an exposure control operation.

17. A camera system according to claim 16, wherein said initial camera operation includes an exposure control operation.

18. A camera system according to claim 11, wherein said initial camera operation includes an exposure control operation.

19. A camera system according to claim 11, wherein the state in which the detection by said second detection means has never been effected is judged by memory information.

20. A camera system according to claim 11, wherein said particular camera operation is selected from among a plurality of exposure control operations on the basis of said set information.

21. A camera system according to claim 11, further comprising a switch for causing the detecting operation by said second detection means to be executed.

22. A camera system according to claim 21, wherein said switch is operated by the contact between said information reading and supplying apparatus and said camera body.

23. A camera comprising:
(a) a detection circuit for detecting a set signal from an information supplying apparatus;
(b) a selection circuit for selecting a particular camera operation from among a plurality of settable camera operations on the basis of the result of the detection by said detection circuit;
(c) a change-over circuit for changing over a first mode in which said particular camera operation selected by said selection circuit is performed and a second mode in which a camera operation set by a setting circuit is performed;
(d) a memory circuit for memorizing particular information therein when said detection circuit has once executed the detecting operation; and
(e) a control circuit for causing said particular camera operation selected by said selection circuit to be performed when the first mode has been brought about by said change-over circuit and said memory circuit has memorized said particular information therein, said control circuit causing a preset initial camera operation to be performed when said memory circuit does not memorize said particular information therein.

24. A camera according to claim 23, wherein said set information is output in the form of a light signal from said information supplying apparatus.

25. A camera according to claim 24, wherein said detection circuit includes a circuit element for receiving said light signal.

26. A camera according to claim 23, wherein said particular camera operation includes an exposure control operation.

27. A camera according to claim 26, wherein said initial camera operation includes an exposure control operation.

28. A camera according to claim 23, wherein said initial camera operation includes an exposure control operation.

29. A camera according to claim 23, further comprising a switch for causing the detecting operation by said detection circuit to be executed.

30. A camera according to claim 29, wherein said switch is operated by the contact between said information supplying apparatus and a camera body.

31. A camera according to claim 23, wherein said plurality of camera operations selectable by said selection circuit include said initial camera operation.

* * * * *

UNITED STATES PATENT AND TRADEMARK OFFICE
CERTIFICATE OF CORRECTION

PATENT NO. : 5,097,283
DATED : March 17, 1992
INVENTOR(S) : JIRO KAZUMI

It is certified that error appears in the above-identified patent and that said Letters Patent is hereby corrected as shown below:

<u>TITLE PAGE</u>
[30] : Insert --Foreign Application Priority Data
Dec. 28, 1989 [JP] Japan ........... 1-344811--.

<u>COLUMN 2</u>:
Line 13, "19b ," should read --19b,--.

Signed and Sealed this

Fourth Day of January, 1994

Attest:

BRUCE LEHMAN

Attesting Officer | Commissioner of Patents and Trademarks